(12) United States Patent
Hung et al.

(10) Patent No.: US 7,120,100 B2
(45) Date of Patent: Oct. 10, 2006

(54) METHOD FOR PREVENTING AN OPTICAL RECORDING DEVICE FROM ERRONEOUS DEFECT DETECTING DURING WRITING

(75) Inventors: Chien-Li Hung, Hsinchu (TW); Chi-Yuan Liu, Hsinchu (TW)

(73) Assignee: Lite-On IT Corp., (TW)

( * ) Notice: Subject to any disclaimer, the term of this patent is extended or adjusted under 35 U.S.C. 154(b) by 557 days.

(21) Appl. No.: 10/666,574

(22) Filed: Sep. 19, 2003

(65) Prior Publication Data
US 2004/0059987 A1    Mar. 25, 2004

(30) Foreign Application Priority Data
Sep. 20, 2002  (TW) ................ 91121669 A

(51) Int. Cl.
G11B 7/00    (2006.01)

(52) U.S. Cl. ................ 369/53.15; 369/59.17

(58) Field of Classification Search ........... 369/53.15, 369/59.17
See application file for complete search history.

(56) References Cited

U.S. PATENT DOCUMENTS 4,189,745 A * 2/1980 Ushio et al. ............. 386/113

* cited by examiner

Primary Examiner—Gautam R. Patel
(74) Attorney, Agent, or Firm—Raymond Sun

(57) ABSTRACT

In a method of detecting defects during a write operation for an optical disk recording device, during a period of time immediately after writing begins, a sub-beam added (SBAD) signal is compared with a reference signal having a second threshold frequency. A defect is identified when a difference between the SBAD signal and the reference signal exceeds either a second upper limit or a second lower limit. Then, after the short period of time has elapsed, a SBAD signal is compared with and a reference signal having a first threshold frequency that is less than the second threshold frequency. A defect is identified when a difference between the SBAD signal and the reference signal exceeds either a first upper limit that is less than the second upper limit, or a first lower limit that is greater than the second lower limit.

8 Claims, 4 Drawing Sheets

| LNK | RI1 | .. | RI4 | UD1 | ..... | UD32 | RO1 | RO2 |

METHOD FOR PREVENTING AN OPTICAL RECORDING DEVICE FROM ERRONEOUS DEFECT DETECTING DURING WRITING

BACKGROUND OF THE INVENTION

1. Field of the Invention

The present invention relates to a method of defect detecting in an optical recording device, and in particular, to a method for preventing erroneous defect detection when the optical recording device switches from read to write.

2. Description of the Prior Art

The Mount Rainier disk recording format was developed by Compaq, Microsoft, Philips, Sony, and other companies, for defect management. For optical recording devices that utilize the defect management function, the general method of detecting defects is to take advantage of the fact that the sub-beam added (SBAD) signal generated by the optical head will be maintained at a certain level when the optical recording device performs writing to a disk. When a defect is encountered, the SBAD signal will vary due to the abnormal amount of the light reflected from the disk. In this way, the optical recording device is able to determine whether the disk contains a defect based on a function of level variations in the SBAD signal.

As shown in FIG. 1, in order to measure the level variations in the SBAD signal more accurately, one can first pass the SBAD signal through a low-pass filter to obtain a stable and slowly changing signal, which is called SBAD_lpf signal. This SBAD_lpf signal is used as the reference signal. During the writing process, the SBAD signal is compared with the reference signal (SBAD_lpf signal). When the difference between two signals exceeds a preset upper limit (i.e., the SBAD signal is higher than the reference signal) or a lower limit (i.e., the SBAD signal is lower than the reference signal), a defect signal will be activated. The period of the activated defect signal corresponding to an area on the disk is determined as a defect area. The optical recording device will label the defect area according to the length and location of the defect, and then the data is written to a substitute location on the disk, pursuant to the Mount Rainier disk specification.

As shown in FIG. 2, if the threshold frequency of the low-pass filter for the reference signal (SBAD_lpf signal) shown in FIG. 1 is set higher, the reference signal (SBAD_lpf signal) will approach the SBAD signal more quickly and then cause the shorter period of the activated defect signal. This means that the defect area may not be detected completely. Therefore, when detecting whether a disk has defects, it is necessary to select an appropriate threshold frequency of the low-pass filter for the reference signal (SBAD_lpf signal) to make the reference signal vary slowly so that the entire defect area can be detected.

Generally speaking, the SBAD signal will drop or rise suddenly at the instant that writing is started. For example, as shown in FIG. 3, when writing is started, the SBAD signal will suddenly drop to a level that is below the reference signal (SBAD_lpf ), so the defect signal will be activated because a lower limit is detected. The period of the activated defect signal identifies the existence of a defect area. At that time period, however, the detected defect area is an erroneous defect detection. In fact, the power change of the laser from read to write also causes the SBAD signal to suddenly drop or rise even though there may be no defect area in the starting location of writing.

Consequently, when level variation of the SBAD signal is used to determine whether there are defect areas on a disk, it is very likely that the SBAD signal generated by the optical head will rise or drop suddenly due to the variation in the laser power of the optical head (as shown in FIG. 4) during the process when the optical head switches from read to write at the instant that the optical recording device initiates a write operation. In order to prevent erroneous defect detection, the gain of the SBAD signal can be adjusted to reduce the difference between the SBAD signal and the SBAD_lpf signal before the time and at the time writing is started. However, this method cannot completely eliminate the aforementioned problem, because there still may be a difference that occurs that exceeds the upper limit or lower limit. As a result, the starting location for a writing operation may be misidentified or the actual defect may go undetected.

If there is a defect area on the disk and the optical recording device is unable to detect it during writing, the data stored at that location will be unreadable. If there is no defect at a particular location on the disk and the optical recording device erroneously identifies the existence of a defect, not only will storage space on the disk be wasted, but it will also take more time for the optical recording device to perform its read and write operations.

As shown in FIG. 5, in order to avoid defect detection failures that occur when the SBAD signal rises or drops suddenly at the beginning of writing, another conventional method of solving the problem is to reset the reference signal to have the same value with the SBAD at the instant that writing is started. However, the optical recording device might immediately encounter a defect just when writing starts (i.e., during the time that the optical head switches from reading to writing). In this case, the reference signal (SBAD__lpf) might quickly drop to the level of the SBAD signal at the starting point of writing. As a result, an erroneous defect detection occurs because of the slowly changing reference signal causing an appearance of an upper limit.

Thus, the above-described prior art methods for determining whether there are defective locations on a disk based on level variations of the SBAD signal and the reference signal still carry inconveniences and problems that need to be solved in practical application, since detection failures still tend to occur during the time that the optical head switches from reading to writing.

SUMMARY OF THE DISCLOSURE

It is an object of the present invention to provide a method that can effectively prevent an optical recording device from erroneous defect detecting during writing.

In order to accomplish the objects of the present invention, the present invention provides a method of detecting defects during a write operation for an optical disk recording device. First, in a short period of time immediately after writing begins, a sub-beam added (SBAD) signal is compared with a reference signal output by a low pass filter having a second threshold frequency, and a defect is identified when a difference between the SBAD signal and the reference signal exceeds either a second upper limit or a second lower limit. Then, after the short period of time, a SBAD signal is compared with and a reference signal output by the low pass filter having a first threshold frequency, and a defect is identified when a difference between the SBAD signal and the reference signal exceeds either a first upper limit or a first lower limit. In the present invention, the second threshold frequency is higher than the first threshold frequency, the second upper limit is greater than the first upper limit, and the second lower limit is less than the first lower limit.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 6:
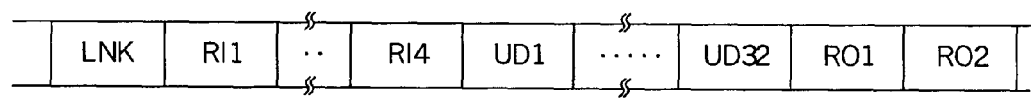
FIG. 6 illustrates the format of packet writing used for writing data in a disk according to the present invention.

FIG. 6 shows the packet write format used when writing data to a disk. A packet is comprised of 1 link block (LNK), 4 run-in blocks (RI1–RI4), 32 user data blocks (UD1–UD32), and 2 run-out blocks (RO1–RO2). The first 5 blocks of a packet are a period of buffer time used for data identification and are provided in consideration of the fact that the laser output power from the optical head is unstable at the beginning of writing. Writing of real data will be started with the sixth block. After writing of the data is completed, the two run-out blocks (RO1–RO2) are used as the end of the packet write.

Figure 7:
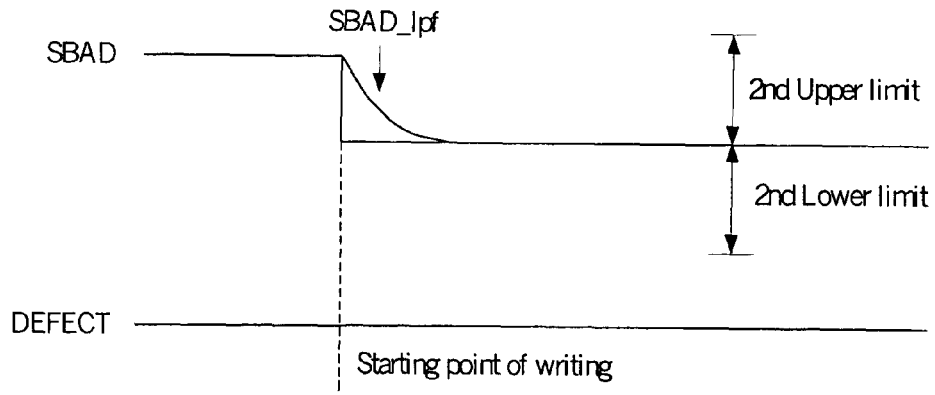
FIG. 7 is a waveform diagram illustrating the detection of defect locations on a disk according to the present invention by comparing the SBAD signal and the reference signal.

As shown in FIG. 7, the present invention primarily takes advantage of the time of the first five blocks of the packet write to help an optical recording device to properly adjust relative settings during writing. The settings include the threshold frequency of the low pass filter, the upper limit, and the lower limit. Normally, the optical recording device has a SBAD signal generated by the optical head and a reference signal (SBAD_lpf) obtained by passing the SBAD signal through a low-pass filter having a first threshold frequency. Also, a first upper limit and a first lower limit that are used for determining defect locations are preset. Because the short period of time immediately after writing is started is not user data block, a second set of settings can be used during this short period of time. In this short period of time, the first threshold frequency is increased to a second threshold frequency and the preset first upper limit and the first lower limit are changed to a second upper limit and a second lower limit. In this way, during the short period of time immediately after writing begins, the reference signal, which is output by the low pass filter having the second threshold frequency, can change quickly to approach the SBAD signal. If the second lower limit is extended enough, no defect area will be detected in the short period of time. This present method is different from the conventional method of changing the value of the reference signal to have the same value of the SBAD signal at the time that writing starts. In the meantime, the upper and lower limits for determining defective locations are changed; that is, the first upper limit is increased to the second upper limit, and the first lower limit is decreased to the second lower limit. In this way, misdetection of defect locations in the region of the starting location can be avoided.

Figure 1:
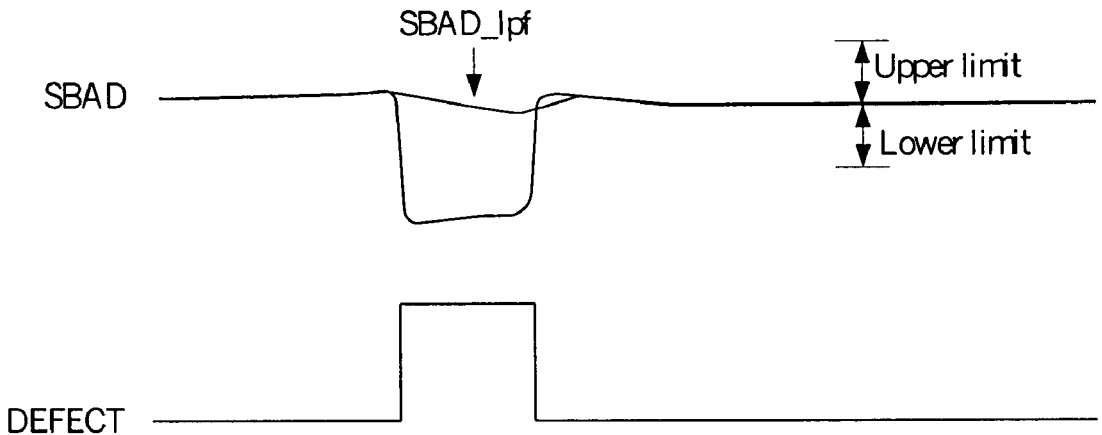
FIG. 1 is a waveform diagram illustrating the conventional detection of defect locations on a disk by comparing the SBAD signal and a reference signal.
Figure 2:
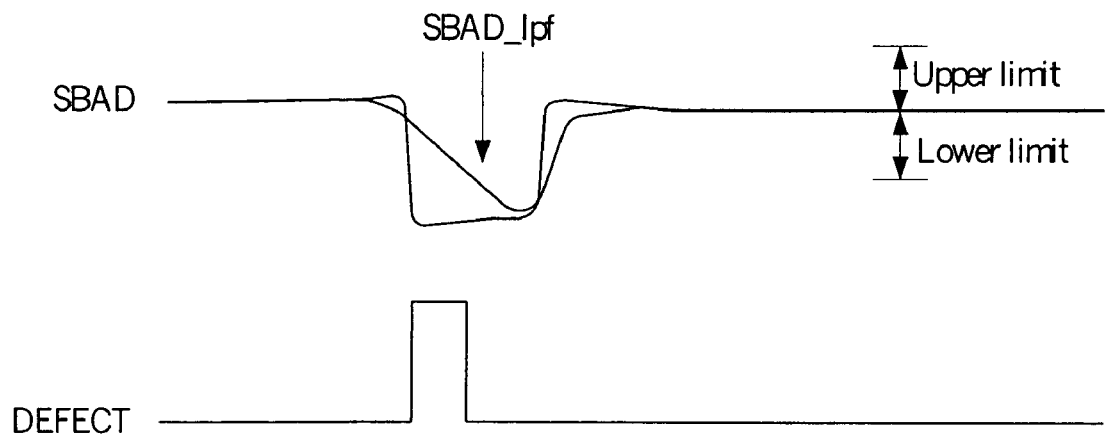
FIG. 2 is a waveform diagram illustrating the conventional detection of defect locations on a disk by comparing the SBAD signal and a reference signal which is output by a low pass filter having a higher threshold frequency.
Figure 3:
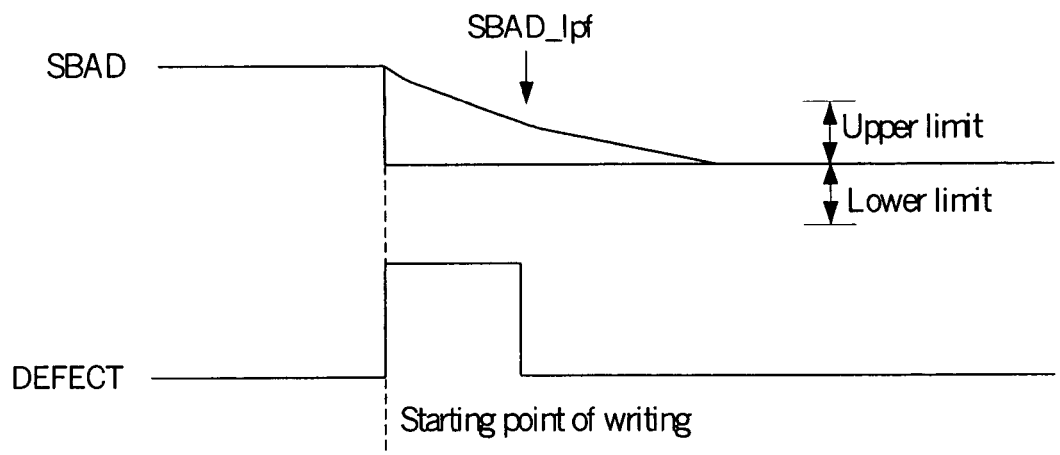
FIG. 3 is a waveform diagram illustrating the conventional detection of defect locations on a disk by comparing the SBAD signal and the reference signal at the start of writing.
Figure 4:
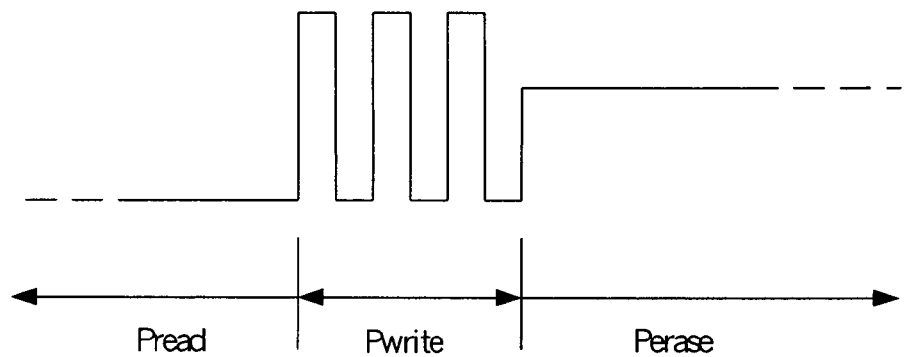
FIG. 4 is a waveform diagram illustrating the variation in the laser output power when the optical head switches from reading to writing.
Figure 8:
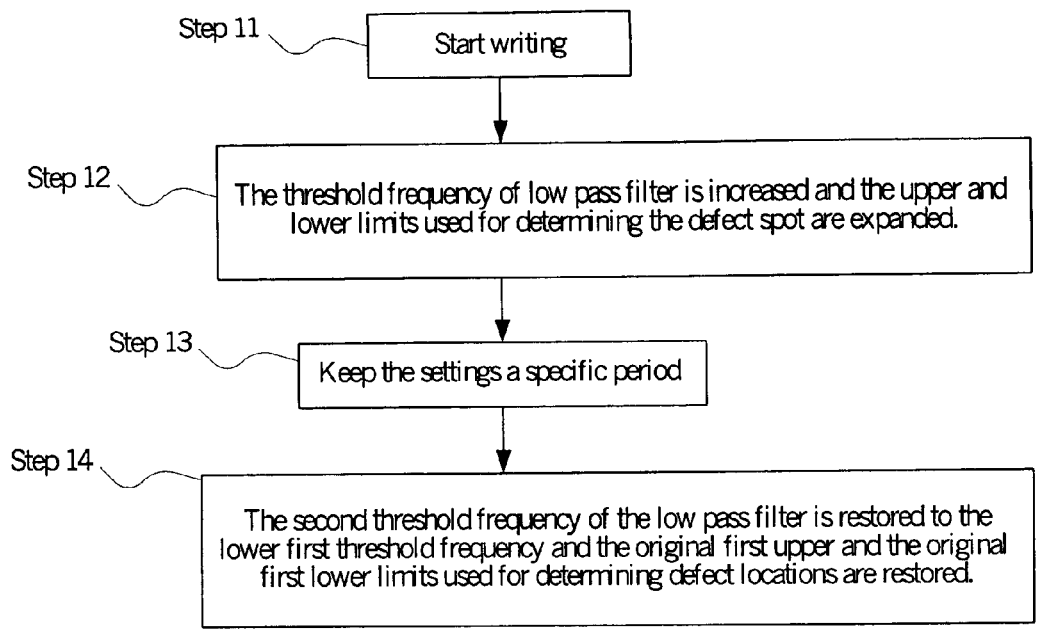
FIG. 8 is a flowchart illustrating a method for adjusting the settings in accordance with the present invention.

FIG. 8 is a flowchart that illustrates the process of adjusting the threshold frequency of the low pass filter according to the present invention. The process has the following steps:

Step 11: At the instant that writing is started, the optical head switches from read to write. At that time, the laser output power from the optical head will vary (as shown in FIG. 4) and affect the variation of the SBAD signal generated by the optical head.

Step 12: The threshold frequency of the low pass filter is increased. At the same time, the upper and lower limits used for determining the defect spot are expanded. In other words, the original first threshold frequency of the low-pass filter is increased to a second threshold frequency so that the reference signal that is output by the low pass filter having the second threshold filter can approach the SBAD signal at a relatively high response speed. In the meantime, the first upper limit is increased to the second upper limit, and the first lower limit is decreased to the second lower limit to have more tolerance not to detect a defect in the short period of time after switching from read to write.

Step 13: Maintain the settings for a specific period of time (e.g., the time for the first five blocks of the packet write). The maintained settings include the second threshold of the low pass filter, the second upper limit, and the second lower limit.

Step 14: The second threshold frequency of the low pass filter is restored to the lower first threshold frequency. In the meantime, the original first upper limit and the original first lower limit used for determining defect locations are restored. The reference signal that is output by the low pass filter having the first threshold frequency is compared with the stable SBAD signal, and the writing of the data in the user data blocks can be started.

Figure 5:
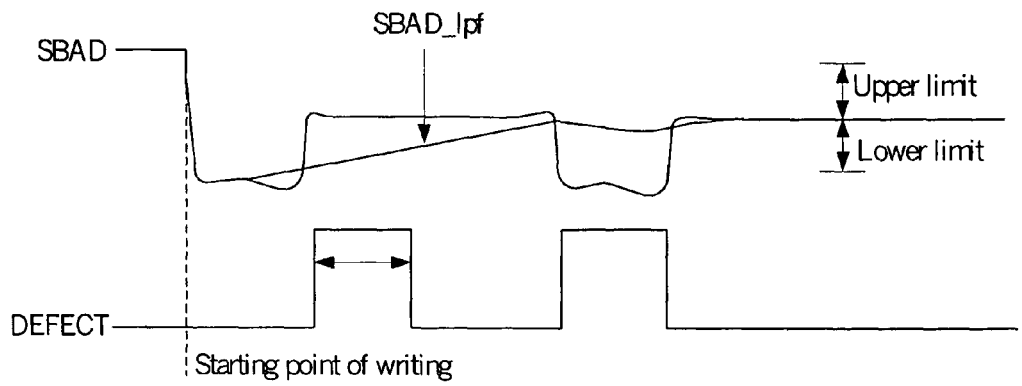
FIG. 5 is a waveform diagram illustrating the conventional detection of defect locations on a disk by resetting the value of the reference signal to have the same value with the SBAD signal at the start of writing.
Figure 9:
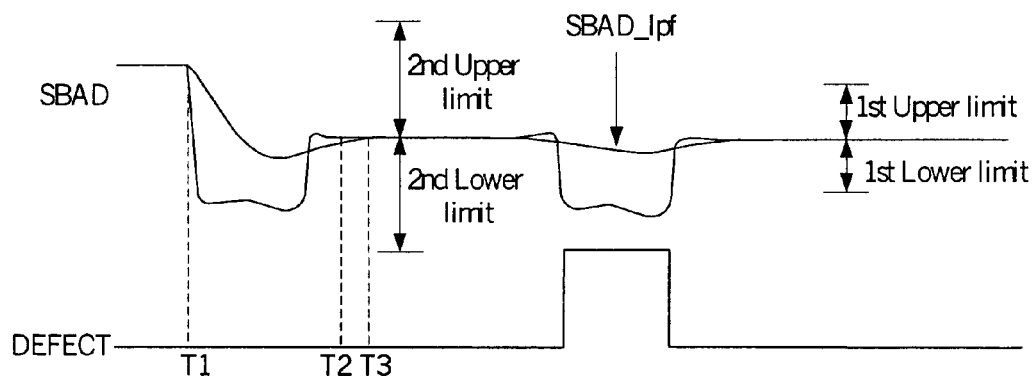
FIG. 9 is a diagram illustrating the detection of defect locations on a disk according to the present invention.

FIG. 9 is a waveform diagram that compares the SBAD signal and the reference signal (SBAD_pf1) obtained by following the steps shown in FIG. 8 for adjusting and restoring the settings. T1 is the time when writing is started (i.e., during the process when the optical head switches from reading to writing). At that time, the output reference signal (SBAD__1pf) is switched from the low pass filter having the first threshold frequency (for example 13 Hz) to the low pass filter having the second threshold frequency (for example 160 Hz), so that the reference signal approaches the SBAD signal more quickly. Also, the upper and lower limits used for determining defect locations are expanded. When FIG. 9 is compared with FIG. 5 (where the reference signal is immediately reset to the same value of the SBAD signal when writing is started), it is clear that the present invention can effectively prevent misdetection of defects. At the short time period between T1 and T2, the optical recording device encounters a defect immediately after the start point of writing. In this short time period of the link block (LNK) and four run-in blocks (RI1–RI4), any defect in the region need not to be detected because no user data is being recorded in these blocks. As a result, the second upper limit or the second lower limit can prevent the defect to be detected. At T3, all the settings are restored to the original settings, and writing of the user data blocks begins from time T3. After T3, any defect is detected by using the original settings, such that the reference signal (SBAD_lpf) is output by the low pass filter having the first threshold frequency, the upper limit is changed to the first upper limit, and the lower limit is changed to the first lower limit.

The SBAD signal will suddenly rise or drop immediately after writing is started. If there are no defects on the disk at the time that writing is started, the reference signal will quickly approach the SBAD signal and no any defect will be detected because the difference between the SBAD signal and the reference signal will not exceed the second upper limit and the second lower limit. On the other hand, if there is a defect on the disk at that time, the defect can be skipped because the upper and lower limits used for determining defects has been expanded. The adjustment of the threshold frequency of the low pass filter and expansion of the upper and lower limits used for determining defects are all performed during the time of the first five blocks of the packet write. Before the sixth block of the packet write arrives, all settings are restored to the original settings, so that the optical recording device can correctly determine whether the disk has a defect and is able to write the user data smoothly in the user data blocks.

In summary, the method according to the present invention has the following characteristics:

(1) Misdetection of defects can be effectively prevented by increasing the threshold frequency of the low pass filter and expanding the upper and lower limits used for determining defects immediately after writing is started.

(2) When misdetection of defects is minimized, writing can be performed more smoothly. In other words, the data written on the disk can be read out smoothly, and it is possible to avoid wasted storage space on the disk, and to avoid wasting time reading bad data.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method of detecting defects during a write operation for an optical disk recording device, comprising:
   a. in a short period of time immediately after writing begins:
      i. comparing a sub-beam added (SBAD) signal and a reference signal output by a low pass filter having a second threshold frequency, and
      ii. identifying a defect when a difference between the SBAD signal and the reference signal exceeds either a second upper limit or a second lower limit; and
   b. after the short period of time:
      i. comparing the SBAD signal and a reference signal output by the low pass filter having a first threshold frequency, and
      ii. identifying a defect when a difference between the SBAD signal and the reference signal exceeds either a first upper limit or a first lower limit;
   wherein the second threshold frequency is higher than the first threshold frequency, the second upper limit is greater than the first upper limit, and the second lower limit is less than the first lower limit.

2. The method of claim 1, wherein the short period of time is equal to the time for the first five blocks of a packet write.

3. The method of claim 1, wherein the second threshold frequency, the second upper limit and the second lower limit are maintained for the duration of the short period of time.

4. A method of preventing an optical disk recording device from failing to correctly detect defects during writing, wherein the optical disk recording device has a preset first threshold frequency, a preset first upper limit and a present first lower limit, comprising:
   a. starting to write data;
   b. increasing the first threshold frequency to a second threshold frequency, increasing the first upper limit to a second upper limit, and decreasing the first lower limit to a second lower limit;
   c. allowing a predetermined period of time to pass; and
   d. decreasing the second threshold frequency to the first threshold frequency, decreasing the second upper limit to the first upper limit, and increasing the second lower limit to the first lower limit.

5. The method of claim 4, wherein the predetermined period of time is equal to the time for the first five blocks of a packet write.

6. The method of claim 4, further including:
   identifying a defect when a difference between a sub-beam added (SBAD) signal and a reference signal exceeds either the second upper limit or the second lower limit.

7. The method of claim 4, further including:
   identifying a defect when a difference between a sub-beam added (SBAD) signal and a reference signal exceeds either the first upper limit or the first lower limit.

8. The method of claim 6, further including:
   identifying a defect when a difference between a sub-beam added (SBAD) signal and a reference signal exceeds either the first upper limit or the first lower limit.

* * * * *